United States Patent [19]

Heymann et al.

[11] Patent Number: 4,766,932

[45] Date of Patent: Aug. 30, 1988

[54] STEAM CONTROL VALVE

[75] Inventors: Frank J. Heymann; Gilbert F. Hyde, both of Winter Springs; Thomas L. Schuchart, Casselberry, all of Fla.

[73] Assignee: Westinghouse Electric Corp., Pittsburgh, Pa.

[21] Appl. No.: 49,484

[22] Filed: May 14, 1987

[51] Int. Cl.<sup>4</sup> .................. F16K 47/02; F16K 47/14
[52] U.S. Cl. .............. 137/625.3; 137/625.37; 251/282; 251/319
[58] Field of Search .............. 251/318, 319, 282; 137/625.37, 625.3

[56] References Cited

U.S. PATENT DOCUMENTS

| | | | |
|---|---|---|---|
| 2,059,991 | 11/1936 | Goering | 251/318 |
| 3,602,261 | 8/1971 | Brown et al. | 137/625.3 |
| 3,857,542 | 12/1974 | Heymann | 251/120 |
| 4,500,070 | 2/1985 | Riollet et al. | 251/282 |
| 4,679,769 | 7/1987 | Dawawala | 251/319 X |

Primary Examiner—Arnold Rosenthal

[57] ABSTRACT

A steam flow control valve for controlling large fluid flow rates, the valve having a reduced response to vibrational excitations experienced during throttling. A valve stem extending outward from the valve body and connected in the valve to a valve plug is guided by a substantially rigid cylindrical bushing extending substantially through the valve body. The bushing has an inner surface for guiding movement of the valve stem and an outer surface for guiding movement of the valve plug. The plug includes an inner annular guide ring about an upper edge for sliding along the outer surface of the bushing and limiting transverse motion.

5 Claims, 3 Drawing Sheets

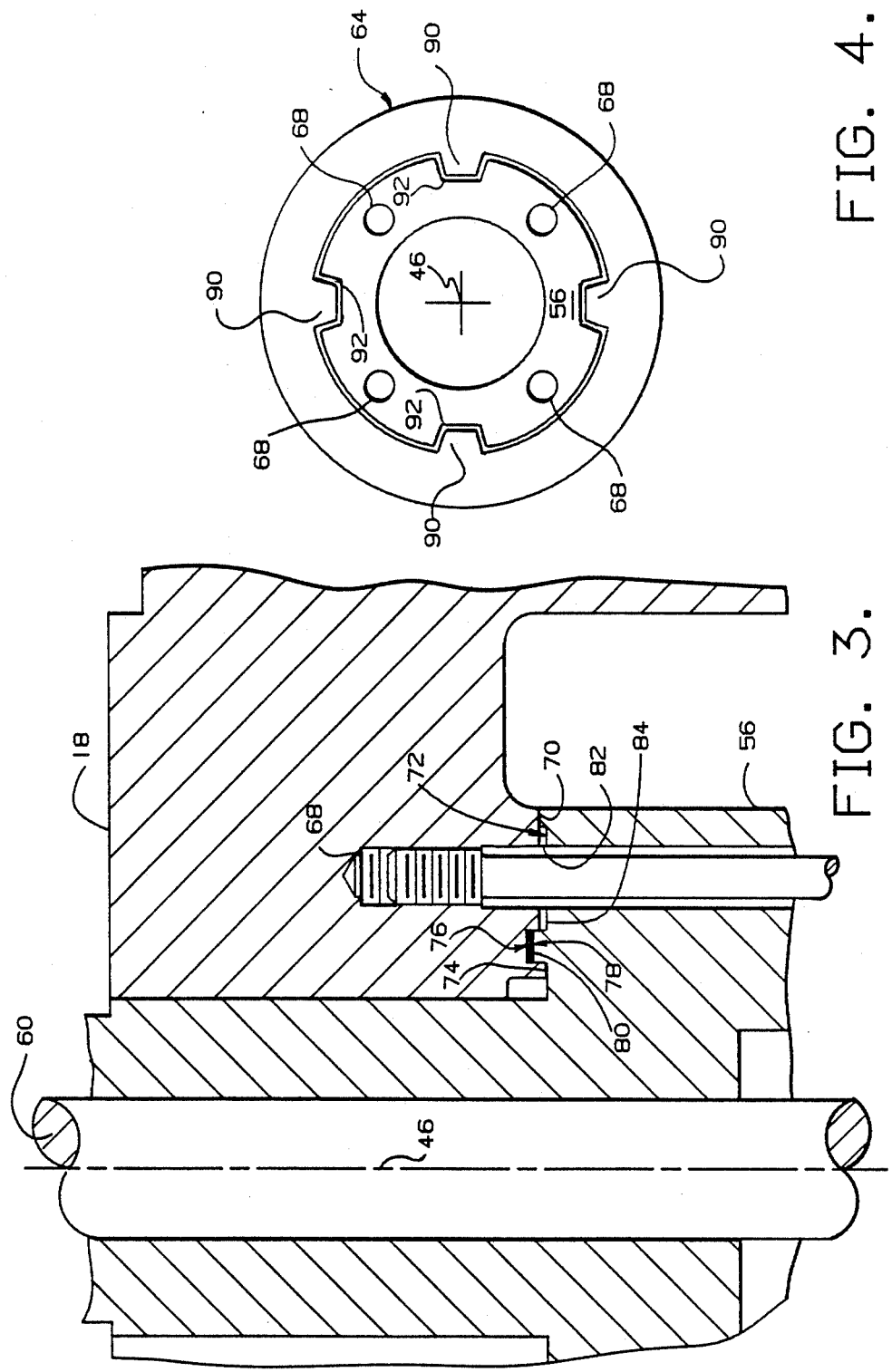

STEAM CONTROL VALVE

FIELD OF THE INVENTION

This invention relates generally to flow control valves and, more particularly, to steam control valves for steam turbines.

BACKGROUND OF THE INVENTION

Electric utility power generating systems generally comprise an alternating current electric power generator driven by a turbine. While some systems employ water turbines, most systems utilize steam turbines in which a controlled steam flow through the turbine regulates the rotational velocity of a driven turbine shaft. The steam flow is controlled, in response to electric power demands placed on the generator, such that the frequency of the alternating current produced by the generator is maintained at a constant value regardless of variations in electric power demands placed on the generator. The steam flow in turn is controlled by various flow control valves such as throttling valves and steam bypass valves.

With increases in the size and capacity of steam turbines, the sizes of throttling valves and bypass valves have also increased in order to handle larger volumetric flows of steam pressures to turbines. Furthermore, light water nuclear power generating systems, which operate at lower steam pressures and temperatures than fossil fuel turbines, require a much greater volumetric steam flow in order to obtain a desired power output. The advent of nuclear powered turbines and the increased size of turbines generally have necessitated that the sizes of turbine steam valves be increased substantially. For example, a suitable size for the valve seat diameter of a main control valve used in an exemplary fossile fuel turbine is approximately seven inches, while the diameter of an equivalent valve seat for a valve in a nuclear powered turbine may be as large as twenty inches. The size of bypass valves also increases considerably in nuclear powered steam generators. Because the size and weight of a valve design must be increased substantially in order to handle the large volumetric steam flow rates found in nuclear generating systems, former designs for control valves and bypass valves which have been suitable for fossil fuel systems are not easily adapted to handle the greater capacity. For example, some applications require valves to perform over large pressure drops ranging down to 2 percent of the supply steam pressure and the valves must also perform efficiently when modulated over small pressure drops, e.g., when a valve is nearly wide open.

The transition to larger valve designs has introduced unusual noise and vibration problems when controlling high steam flow rates. For example, U.S. Pat. No. 3,602,261 to Brown, assigned to Westinghouse Electric Corp., and incorporated herein by reference, discloses a flow muffler which greatly reduces severe vibrations and intense noise levels which occur during the throttling of high capacity steam control valves. However, while the flow muffler is effective in reducing vibration induced noise, it is now believed that other, more subtle, vibration sources exist in valve designs of this type. In particular, prior analyses and proposed remedies have focused primarily upon modifications of the flow muffler under the premise that vibrations would be eliminated by limiting vibratory excitations in and around one valve component, i.e., the muffler. It is now believed that other major factors induce vibrations in numerous areas throughout the valve structures. It is therefore desirable to provide an improved valve design suitable for high volumetric flow of pressurized fluids which has a more limited response to vibrational excitations than former designs.

SUMMARY OF THE INVENTION

Among the several objects of the present invention may be noted the provision of an improved valve design suitable for large flow rate steam turbines which overcomes the above discussed limitations as well as others of the prior art; the provisions of such improved valve design including a means for limiting the amplitude of vibrations found in the valve structure; the provisions of such an improved valve design which achieves improved valve stem and valve plug guide control to impart a maximal stiffness to the guiding surfaces; the provision of such an improved valve design including a means for increasing the stiffness of the valve stem bushing and the stiffness of connection between the valve stem bushing and the valve body in order to minimize the response of the valve to bending moments along the central valve axis and to reduce flexural vibrations in the valve stem during throttling; the provision of such an improved valve design including a means for achieving improved concentricity between the surfaces which guide movements of the valve stem and the valve plug; and the provision of such an improved valve design whereby differential pressures do not form along the surface used to guide movement of the valve plug.

Generally, there is provided an improved valve for controlling large flow rates, the valve having a reduced response to vibrational excitations experienced during throttling. In one embodiment of the invention the valve includes a body member defining a fluid receiving chamber and an outlet port for passing fluid out of the chamber. A valve plug is moveable from a closed position to an open position for selectively blocking the outlet port. A valve stem connected to the valve plug and extending outward from the body member permits positioning of the valve plug by external means. A cylindrical bushing, rigidly connected to the body member, has an inner surface for guiding movement of the valve stem and an outer surface for guiding movement of the valve plug. The bushing is sized and secured to the body member and cooperates with the valve plug in a manner to minimize transverse motion and thus to reduce vibration.

BRIEF DESCRIPTION OF THE DRAWINGS

For a better understanding of the present invention, reference may be had to the following detailed description taken in conjunction with the accompanying drawings in which:

FIG. 3 is an enlarged partial sectional view of the bushing-to-valve bonnet connection employed in the embodiment of FIG. 2; and FIG. 4 is an axial cross-sectional view of an alternative plug guide in accordance with the present invention.

DETAILED DESCRIPTION OF THE INVENTION

The inventive valve design is described by way of example with particular application to a main steam control valve in a steam turbine, but it is to be understood that the valve design is useful in other applications including, but not limited to, bypass valves.

Figure 1:
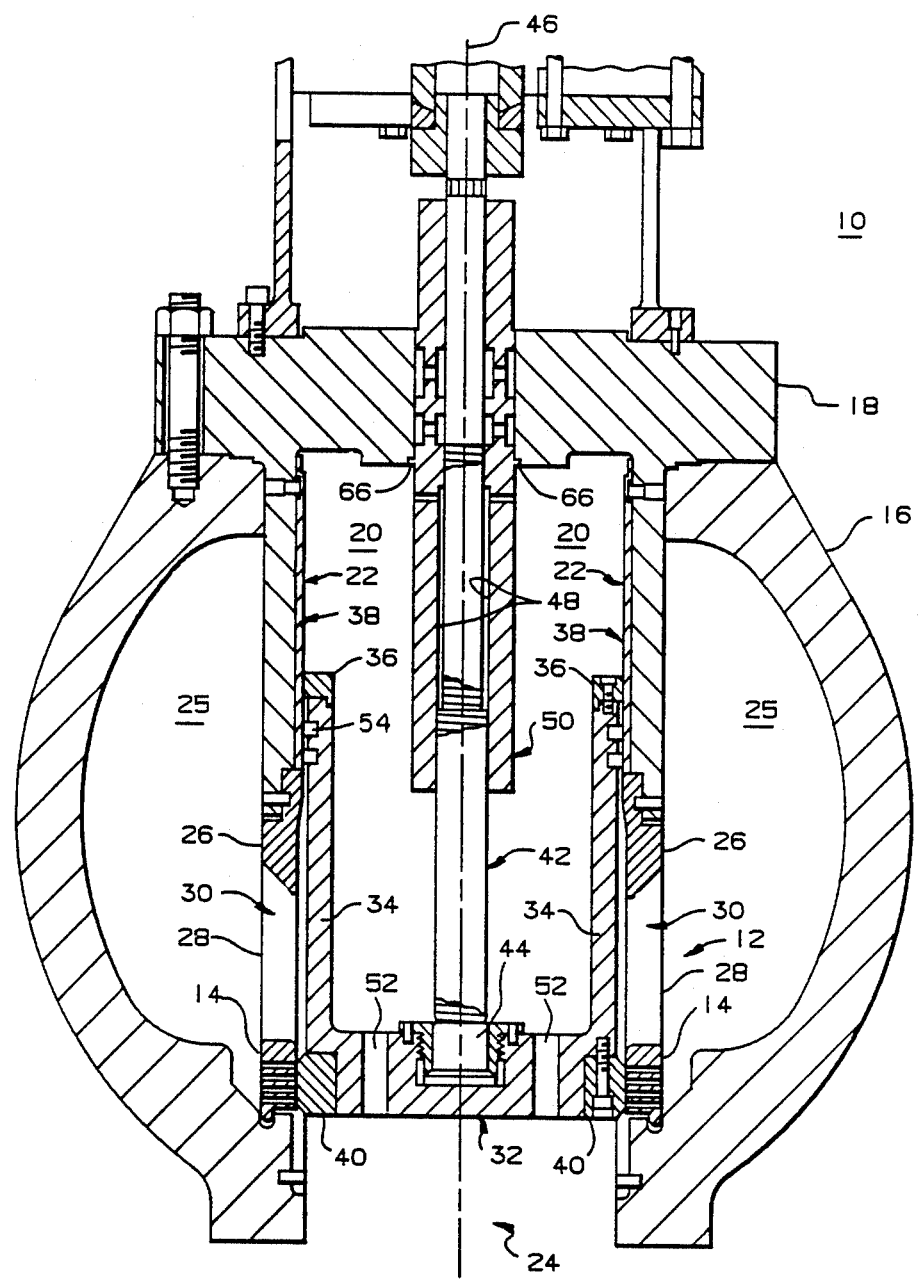
FIG. 1 is a cross-sectional view of a flow control portion of a prior art steam control valve incorporating a flow muffler.

Referring first to FIG. 1, there is shown a cross-section of a flow control portion of a prior art steam control valve 10 which incorporates a valve cage 12 with muffling devices 14 and is of the type referenced above and more fully disclosed in U.S. Pat. No. 3,602,261. The valve structure includes a main valve body member 16 typically fabricated of a carbon steel casting. The valve 10 includes a valve bonnet 18 covering an upper portion of the valve to form a bonnet chamber 20 which is bounded in part by an inner wall or bonnet liner 22. The body member 16 has disposed therein an inlet port (not shown) and an outlet port 24. The body member 16 forms a fluid receiving chamber 25 surrounding the valve cage. The valve cage 12 comprises the lower muffling device 14, an upper ring 26 for attachment to the bonnet 18 and a number of integral struts 28 joining the muffling device 14 to the upper ring 26 and forming openings 30. A valve plug 32 is cup-shaped, having a substantially cylindrical wall 34. An upper guide ring 36 is secured to the plug wall 34 and is in sliding contact with a guiding surface 38 on the inner wall 22 in order to guide movement of the plug 32. The inner wall 22 may be integrally formed with the bonnet 18. A lower guide ring 40, also secured to plug 32, is in sliding contact with the inner surfaces of the valve cage, i.e., the struts 28 and the muffling device 14, in order to provide guidance for plug movement. A valve stem 42, essentially a cylindrical rod connected at a first end 44 to the plug 32, extends upward from the plug 32 along a central axis 46 to a valve control mechanism (not shown). As is common to valves of this design, stem movement is guided by the sliding contact of the valve stem 42 along various portions of the inner cylindrical surface 48 of an elongated bushing 50. The bushing 50, which extends through the bonnet 18, is rigidly connected to the bonnet. The plug 32 includes a plurality of orifices 52 which provide pressure balance between bonnet chamber 20 and the throttled fluid exiting the outlet port 24. Two pressure seal rings 54 prevent the steam from flowing between plug 32 and guiding surface 38 into bonnet chamber 20 and thence into outlet port 24.

Movement of the valve stem 42 by external means, e.g., by a hydraulic actuating system (not illustrated), effects positioning of the valve plug 32 anywhere between closed and open positions. When the valve 10 is operated, the plug 32 is guided by upper and lower guide rings 36 and 40 and by the valve stem 42 sliding along the inner cylindrical surface 48. When the valve plug 32 begins to open, steam entering the valve body 16 initially flows to the outlet port 24 through the muffling device 14 in order to minimize noise and vibrations. When the valve plug is above the device 14, steam also flows through the openings 30.

As disclosed in the aforementioned U.S. Pat. No. 3,602,261, the muffling device 14 comprises an annular member having a plurality of throttling passages for dividing the steam, at small valve openings, into a plurality of discrete flow streams. While the device 14 is useful in reducing noise and vibration, other factors also contribute to such problems.

Figure 2:
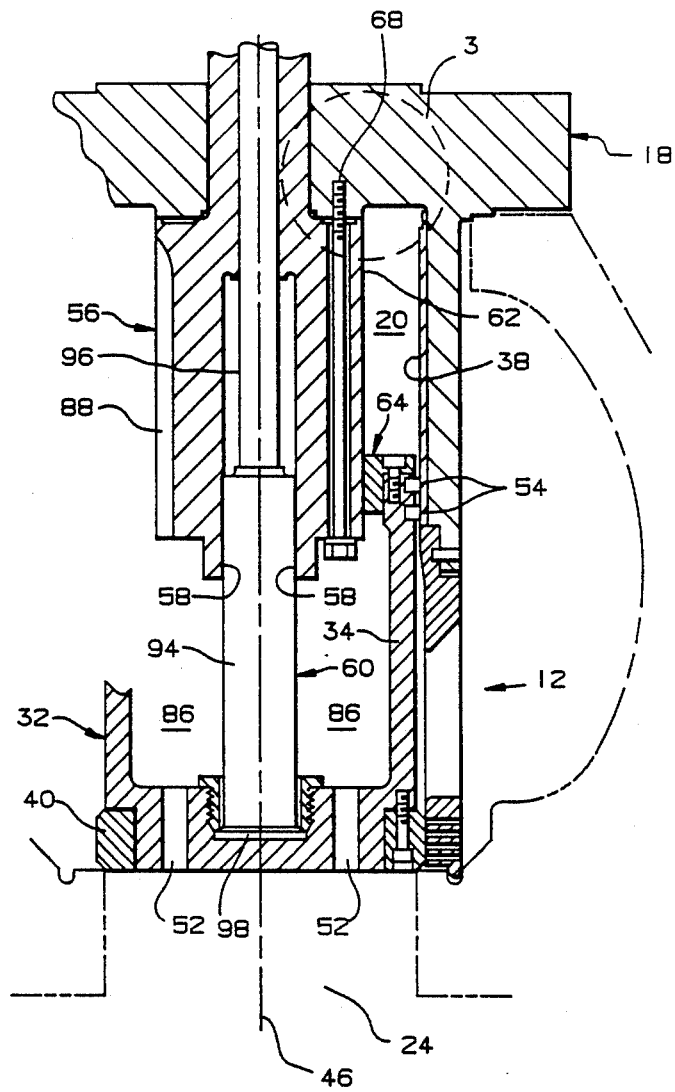
FIG. 2 is a partial cross-section of a steam control valve in accordance with one embodiment of the present invention.

Referring now to FIG. 2, there is shown a partial cross-sectional view of a steam control valve constructed according to the teachings of the present invention. For purpose of description, the valve may be assumed to be substantially the same as the valve 10 of FIG. 1 with the exception of Applicants' inventive modifications to the guiding and positioning of the valve plug.

Notably, guiding surface 38 of liner 22 is now only required for providing a guiding and sealing surface for seal rings 54. Note that rings 54 were used in the prior art valve of FIG. 1. The plug 32 is guided by a substantially different bushing 56 replacing the busing 50 of FIG. 1. The bushing 56 has an inner surface 58 for guiding movement of a valve stem 60 in a manner similar to that described for the stem 42 shown in FIG. 1. However, as is apparent from a comparison of FIGS. 1 and 2, the bushing 56 of FIG. 2 has a substantially larger diameter than the bushing 50 of FIG. 1. The resulting large circumferential outer surface 62 of this bushing 56 is used to guide the valve plug 32 by means of an upper plug guide 64. The guide 64 may take the form of an annular ring connected to and overlaying the inside upper surface of the plug wall 34. Alternatively, the upper plug guide 64 may comprise a plurality of spaced protrusions (not shown) disposed about the inner surface of the wall 34. The lower guide ring 40 assists in guiding plug 32 in the manner previously described.

A distinct advantage of the invention thus far presented is an improved concentricity between the guiding inner surface 58 and the guiding outer surface 62. Formerly, it had been difficult to achieve desired concentricity between the guiding surfaces for the valve stem and the valve plug because of their respective locations on different elements of the valve. In the inventive design, the guiding surfaces 58 and 64 may be tooled to appropriate tolerances on the same machine setup, e.g., on a single lathe setup, and thereby have a common concentric center. The larger diameter of the novel bushing 56 offers two advantages. First, as already noted, the bushing serves as a guiding surface for the upper part of valve plug 32. In addition, the increased diameter results in a greater stiffness along the central axis 46 in order to better withstand bending moments during movement of the plug 32. As a result, the bushing provides better guidance during plug movement and allows for a closer fit between the upper plug guide 64 and the guiding surface 62 for the valve plug 32. It is believed that the added stiffness and the closer tolerances associated with the bushing 56, the plug guide 64 and the plug 32 minimize the movement of the plug 32 in directions transverse to central axis 46. Consequently, the advantageous features of the bushing 56 and the novel arrangement for guiding the upper part of the plug 32 limit vibrational movement of the plug 32 in directions transverse to the central axis 46.

In order to achieve maximum stiffness during guidance of the valve stem and the valve plug, it is necessary to increase the stiffness of the connection between the bushing 56 and the bonnet 18. In the past, as illustrated in FIG. 1, bushings were fastened to the bonnet by peening a narrow flange 66 into the bonnet 18. In other prior art designs, a bushing may include a relatively thin flange about its base adjacent the bonnet and be attached to the bonnet by a plurality of short stem bolts. In the present invention, a rigid connection is provided by a plurality of fastening bolts 68 which extend for substantially the entire extension of the bushing 56 into the valve cage 12. In addition, an arrangement of metal-to-metal compression stops improves the stiffness of the connection between the bushing 56 and the bonnet 18. As can be seen in FIG. 3, an outer annular compression stop 70 is formed adjacent to the outer diameter of the bushing 56. Between the fastening bolts 68 and the central axis 46 there is formed on the bonnet 18 an inner annular compression stop 74 adjacent an annular recess 76. A raised annular surface 78 on the bushing 56 mates with the recess 76. A flexible gasket 80 is placed in the recess 76 and is compressed by the annular surface 78 when the bolts 68 are tightened. The bolts 68 are drawn down until a sufficient metal-to-metal contact pressure is acchieved at the compression stops 70 and 74 to prevent their gapping under action of bending moments due to lateral forces on the stem 60. Annular gaps 82 and 84 disposed about the fastening bolts 68 reduce the metal-to-metal contact surface area in order to increase compression pressure at the inner and outer stops when the bolts 68 are torqued down. The bolt length, which may exceed ten inches, provides a greater sensitivity than present in former designs for achieving a desired torquing moment and also reduces the likelihood of overstressing the bolts.

Referring again to FIG. 2, it can be seen that the combination of bushing 56 and upper plug guide 64 form a plug chamber 86 separate from the bonnet chamber 20. The bushing 56 includes a plurality of slots or passageways 88 which provide a means for pressure balancing between the plug chamber 86 and bonnet chamber 20. Alternatively, slots may be included in the plug guide 64. The orifices 52 provide pressure balance between the plug chamber 86 and the fluid exiting the outlet port 24.

In an alternate embodiment, the plug guide 64 may be an annular ring having a plurality of protrusions or splines 90 which are received in operative (sliding) associated by complimentary grooves 92 on the surface 62 of the bushing 56 as illustrated in FIG. 4. An advantage of this arrangement is the further reduction of plug movement transverse to the central axis 46.

The increased outside diameter of the bushing 56 also permits an increase in the diameter of the valve stem 60 in order to improve the stiffness of the connection between the plug 32 and the valve stem 60. With reference to FIG. 2, the valve stem 60 is illustrated as comprising a cylindrical rod having a large diameter portion 94 which slides within the enlarged diameter portion of the bushing 56. The upper portion 96 of the stem 60 is substantially the same as the stem 42 of FIG. 1 since it primarily serves to connect the stem to the valve actuating mechanism. A lower end 98 (as oriented in FIG. 2) of stem 60 connects to the plug 32 with a tight but nonrigid connection.

From the foregoing, it is now apparent that a novel valve design has been presented which reduces movement of several component parts which movement has been associated with the excitation of valve vibration and valve damage. The improved design provides for stiffened support of the valve stem as well as the plug by the provision of guiding surfaces along the inside and outside diameters of an enlarged bushing. The added stiffening is provided by improved metal-to-metal compression stops as well as a larger valve stem diameter. Without departing from the objects set out hereinbefore, as well as others, it is comtemplated that changes in the inventive valve design 10 may be made by those having ordinary skill in the art and that the inventive features may be applied to a wide variety of valves without departing from the spirit of the invention or from the scope of the invention as set forth in the claims which follow.

We claim:

1. A valve for controlling the flow of a pressurized fluid comprising:
   a. a body member having a central axis, a valve cage concentric with said central axis, and a bonnet for supporting said body member and said valve cage, said body member forming a fluid chamber surrounding said valve cage, the valve having an outlet port connectable to said fluid chamber through said valve cage;
   b. a valve plug having a substantially cylindrical plug wall, said plug being concentrically disposed within said valve cage and moveable from an open position to a closed position whereby said chamber is isolated from said outlet port when said valve plug is in a closed position thus blocking passage of fluid through the valve;
   c. a valve stem having a first end connected to said valve plug, a first portion extending into said valve cage, and another portion extending therefrom for moving said plug along said central axis;
   d. guiding means attached to an inner surface of said valve plug for guiding movement of said plug substantially parallel to said central axis, said guiding means comprising an annular guide ring attached to an upper portion of said plug wall, said guide ring separating said valve cage into a bonnet chamber and a plug chamber, the valve including means for balancing pressure between said chambers; and
   e. bushing means rigidly connected to said bonnet and extending into said valve cage, said bushing means having an inner surface along a central bore for guiding movement of said valve stem along said central axis and an outer surface in operative association with said plug guiding means for guiding movement of said valve plug between open and closed positions.

2. The valve of claim 1 further comprising means for stiffening the connection of said bushing means to said bonnet for minimizing transverse vibrations of said valve stem and said valve plug caused by bending moments along the central axis.

3. A valve for controlling the flow of a pressurized fluid comprising:
   a. a body member having a central axis, a valve cage concentric with said central axis, and a bonnet for supporting said body member and said valve cage, said body member forming a fluid chamber surrounding said valve cage, the valve having an outlet port connectable to said fluid chamber through said valve cage;
   b. a valve plug having a substantially cylindrical plug wall, said plug being concentrically disposed within said valve cage and moveable from an open position to a closed position whereby said chamber is isolated from said outlet port when said valve plug is in a closed position thus blocking passage of fluid through the valve;
   c. a valve stem having a first end connected to said valve plug, a first portion extending into said valve cage, and another portion extending therefrom for moving said plug along said central axis;

d. guiding means attached to an inner surface of said valve plug for guiding movement of said plug substantially parallel to said central axis, said guiding means comprising an annular guide ring attached to an upper portion of said plug wall, said guide ring separating said valve cage into a bonnet chamber and a plug chamber, the valve including means for balancing pressure between said chambers;

e. bushing means rigidly conencted to said bonnet and extending into said valve cage, said bushing means having an inner surface along a central bore for guiding movement of said valve stem along said central axis and an outer surface in operative association with said plug guiding means for guiding movement of said valve plug between open and closed positions;

f. a plurality of circumferentially space protrusions formed on an inner annular surface of said valve plug guide ring facing said bushing means; and g. a corresponding plurality of grooves formed on said outer surface of said bushing means for receiving said protrusions.

4. A valve for controlling the flow of a pressurized fluid comprising:

a. a body member having a central axis, a valve cage concentric with said central axis, and a bonnet for supporting said body member and said valve cage, said body member forming a fluid chamber surrounding said valve cage, the valve having an outlet port connectable to said fluid chamber through said valve cage;

b. a valve plug having a substantially cylindrical plug wall, said plug being concentrically disposed within said valve cage and moveable from an open position to a closed position whereby said chamber is isolated from said outlet port when said valve plug is in a closed position thus blocking passage of fluid through the valve;

c. a valve stem having a first end connected to said valve plug, a first portion extending into said valve cage, and another portion extending therefrom for moving said plug along said central axis;

d. guiding means attached to an inner surface of said valve plug for guiding movement of said plug substantially parallel to said central axis, said guiding means comprising an annular guide ring attached to an upper portion of said plug wall, said guide ring separating said valve cage into a bonnet chamber and a plug chamber, the valve including means for balancing pressure between said chambers;

e. bushing means rigidly connected to said bonnet and extending into said valve cage, said bushing means having an inner surface along a central bore for guiding movement of said valve stem along said central axis and an outer surface in operative association with said plug guiding means for guiding movement of said valve plug between open and closed positions;

f. means for stiffening the connection of said bushing means to said bonnet for minimizing transverse vibrations of said valve stem and said valve plug caused by bending moments along the central axis, said stiffening means comprising a plurality of fastening bolts extending through said bushing means parallel to said central axis, said bolts being substantially the length of said bushing and said valve cage, and inner and outer raised annular surfaces formed at the juncture of said bushing and said bonnet, said surfaces acting as compression stops for stiffening the connection of said bushing to said bonnet; and g. gasket means interposed between said bushing means and said bonnet for preventing leakage of high pressure fluid.

5. The valve of claim 4 wherein said bushing means includes at least one annular recess between said central axis and said fastening bolts adjacent said inner annular surface for receiving a sealing gasket.

* * * * *